June 9, 1925.
J. H. HAMMOND, JR
1,540,881
RECEIVING SYSTEM FOR RADIANT ENERGY
Filed July 9, 1918
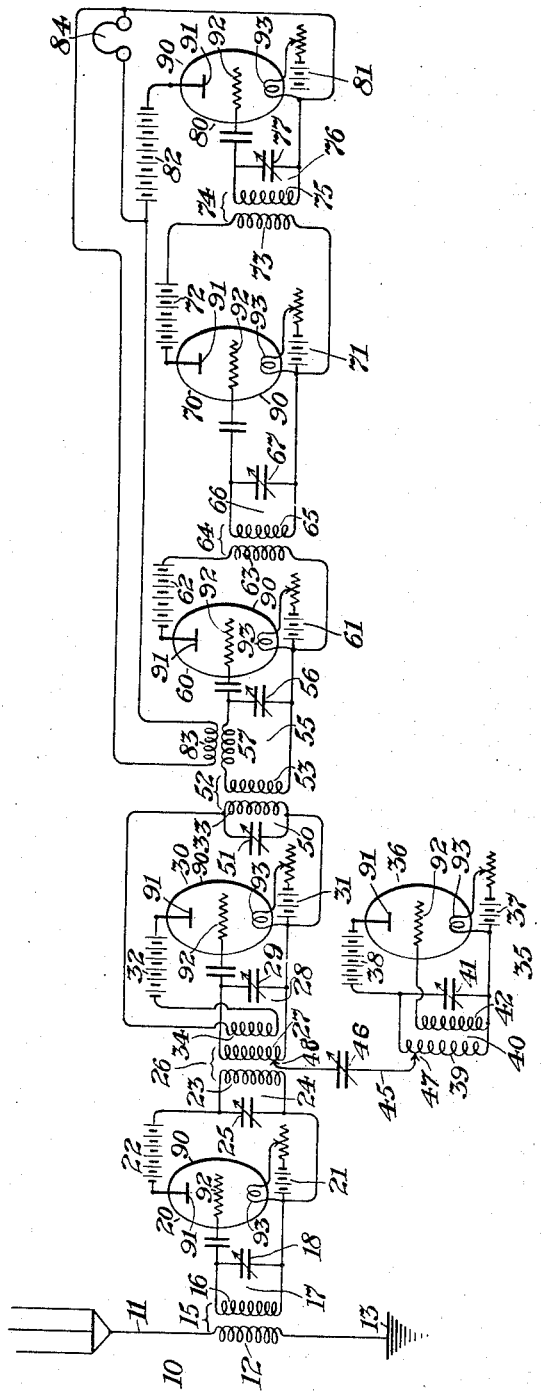
WITNESS
Chas. F. Clagett
INVENTOR
John Hays Hammond Jr.
BY
A. J. Gardner
HIS ATTORNEY Patented June 9, 1925.

1,540,881

UNITED STATES PATENT OFFICE.

JOHN HAYS HAMMOND, JR., OF GLOUCESTER, MASSACHUSETTS.

RECEIVING SYSTEM FOR RADIANT ENERGY.

Application filed July 9, 1918. Serial No. 244,050.

*To all whom it may concern:*

Be it known that I, JOHN HAYS HAMMOND, Jr., a citizen of the United States, and a resident of Gloucester, in the county of Essex and State of Massachusetts, have invented certain new and useful Improvements in Receiving Systems for Radiant Energy, of which the following is a specification.

One of the objects of this invention is to provide an improved receiving system adapted to receive electroradiant oscillations in the form of a complex wave comprising a carrier wave having a high frequency of, for instance, 1,000,000 cycles per second, and having superimposed thereon a series of periodic variations having a frequency lower than the frequency of the carrier wave but preferably above the limits of audibility, the periodic variations having a frequency of, for instance, 20,000 cycles per second. The periodic variations may be either in the form of brief, periodic interruptions of the carrier wave or in the form of periodic amplitude variations of the carrier wave. With this form of wave the transmission of signals may be accomplished either by the interruption of the entire wave, or by the interruption of or a variation in the frequency of the periodic variations impressed upon the carrier wave.

Other objects of this invention are to provide in a receiving system for radiant energy improved means for amplifying the received oscillations; and to provide other improvements as will appear hereinafter.

The accompanying drawing is a diagrammatic representation of one form of a receiving system constructed in accordance with this invention.

Referring to the drawing, one embodiment of this invention comprises a receiving system including an open aerial circuit 10 consisting of an antenna 11 having a coil 12 through which the antenna 11 is grounded at 13. The coil 12 forms the primary of a transformer 15 the secondary coil 16 of which is arranged in a closed, oscillatory circuit 17 including a variable condenser 18. The open, aerial circuit 10 and the closed, oscillatory circuit 17 are both tuned to the high frequency of the oscillations intended to be received thereby, for instance, to a frequency of 1,000,000 oscillations per second.

The closed circuit 17 is arranged to control a primary, gaseous, thermionic detector or amplifier 20 which is arranged to be heated by a battery 21 and to control a circuit including a high potential battery 22 and a coil 23. The coil 23 is in a closed, oscillatory circuit 24 which includes a variable condenser 25 and is tuned to the secondary frequency of the radiant oscillations intended to be received by the system, that is to say, to the frequency of the periodic variations of the carrier wave intended to be received, for instance, to a frequency of 20,000 oscillations per second.

The coil 23 forms the primary of a transformer 26 the secondary coil 27 of which is in a closed, oscillatory circuit 28. The circuit 28 includes a variable condenser 29 and is tuned to the secondary frequency of the system, for instance, to 20,000 oscillations per second. This circuit 28 is arranged to control a secondary, thermionic detector or amplifier 30 which is arranged to be heated by a battery 31. The detector 30 controls a circuit including a high potential battery 32, a primary coil 33 and an auxiliary coil 34.

The auxiliary coil 34 is inductively coupled to the secondary coil 27 so that the amplified impulses set up in the controlled circuit 32, 33 and 34 react through the auxiliary coil 34 upon the secondary coil 27 and, consequently, upon the grid of the secondary amplifier 30 to increase the effectiveness of the amplifier. The coupling between the auxiliary coil 34 and the secondary coil 27 is preferably so adjusted as to render the secondary amplifier 30 extremely sensitive, but must not be made so close as to render these circuits self-oscillating.

For producing electrical beats in the closed, oscillatory circuit 28 any suitable local source of electrical oscillations may be provided. In the form of this invention shown in the drawing a well known form of electrical oscillator 35 is provided for this purpose. The oscillator 35 includes a thermionic valve 36 which is arranged to be heated by a battery 37 and to control a circuit including a high potential battery 38 and a coil 39. The coil 39 is in a closed, oscillatory circuit 40 which includes a variable condenser 41 and which is connected through a coil 42 with the grid 92 of the thermionic valve 36. The circuits are so adjusted as to cause the valve 36 to produce electrical oscillations in the closed circuit 40 having a frequency differing by a predetermined amount from the secondary frequency of the system. For instance, the source of oscillations 35 may be so adjusted as to produce in the closed circuit 40 oscillations having a cycle frequency either of 19,000 or of 21,000 per second, thus differing from the secondary frequency of the system by 1,000 cycles per second. The source of oscillations 35 is connected to the closed circuit 28 by an electrostatic coupling 45 comprising a variable condenser 46 one side of which is adjustably connected at a suitable point to the coil 39 by means of a tap 47, and the other side of which is adjustably connected to the coil 27 by means of a tap 48. By this means electrical oscillations of 19,000 or 21,000 cycles per second may be imposed upon the electrical oscillations of 20,000 per second in the closed circuit 28, thus producing electrical beats having a frequency of 1,000 cycles per second in the closed circuit 28.

The coil 33 in the circuit controlled by the secondary amplifier 30 is also in a closed circuit 50 which includes a variable condenser 51 and is tuned to the frequency of the beats set up in the closed circuit 28, for instance, 1,000 oscillations per second. The coil 33 forms the primary of a transformer 52 which has a secondary coil 53 connected in a closed, oscillatory circuit 55. The circuit 55 also includes a variable condenser 56 and a coil 57 is tuned to the beat frequency of the system, for instance, 1,000 oscillations per second.

The closed circuit 55 controls a third amplifier 60 which is arranged to be heated by a battery 61 and to control a circuit including a high potential battery 62 and a coil 63. The coil 63 forms a primary of a transformer 64 which includes a secondary coil 65 connected in a closed, oscillatory circuit 66. The circuit 66 includes a variable condenser 67 and is tuned to the beat frequency of the system, for instance, 1,000 oscillations per second.

The closed circuit 66 is arranged to control a fourth amplifier 70 which is arranged to be heated by a battery 71 and to control a circuit including a high potential battery 72 and a coil 73. The coil 73 forms the primary of a transformer 74 which has a secondary coil 75 arranged in a closed, oscillatory circuit 76 which includes a variable condenser 77 and is tuned to the beat frequency of the system, for instance, 1,000 oscillations per second.

The closed circuit 76 is arranged to control a fifth amplifier 80 which is arranged to be heated by a battery 81 and to control a circuit including a high potential battery 82, an auxiliary coil 83 and a telephone receiver 84 or other receiving instrument or device. The auxiliary coil 83 is inductively coupled to the coil 57 of the closed circuit 55 which controls the third amplifier 60. The inductive coupling between the auxiliary coil 83 and the coil 57 is preferably so adjusted as to render the third, fourth and fifth detectors 60, 70 and 80 extremely sensitive, but this coupling should not be made so close as to render the circuits self-oscillating. By this arrangement the amplified impulses set up in the circuit 82, 83, 84 controlled by the fifth or final amplifier 80 are caused to react through the auxiliary coil 83 and the coil 57 upon the closed circuit 55 controlling the third amplifier 60, and thus increase the effectiveness of the third amplifier 60 and, consequently, of the fourth and fifth amplifiers 70 and 80. The amplifiers 20, 30, 60, 70 and 80 and the thermionic valve 36 may be of any well known or suitable construction, and in the form shown are of the same and a well known construction each comprising a glass evacuated bulb 90 containing a plate terminal 91, a grid or potential gradient changing means 92 and a filament 93, the filament being arranged to be heated as hereinbefore described by the corresponding battery.

In the operation of this improved system, when electro-radiant waves are received having the proper high frequency, for instance, 1,000,000 oscillations per second and having superimposed thereon periodic variations in amplitude, periodic interruptions or any other suitable periodic variations having a suitable frequency, for instance, 20,000 variations per second, the open, aerial circuit 10, 12, 13 will be energized and will cause oscillations having a frequency of 1,000,000 per second and periodically varying at the rate of 20,000 variations per second to be set up in the closed circuit 17, and these oscillations will act through the primary amplifier 20 to set up electrical oscillations of a frequency of 20,000 cycles per second in the closed circuit 24. The latter oscillations will cause corresponding oscillations of 20,000 cycles per second to be set up in the closed circuit 28, and upon these latter oscillations as a result of the action of the local source of oscillations 35 will be imposed oscillations of a frequency of, for instance, 19,000 or 21,000 cycles per second, which will product in the circuit 28 electrical beats having a frequency of, for instance, 1,000 cycles per second. These oscillations of 20,000 cycles per second with the beats of 1,000 cycles per second imposed thereon will act through the second amplifier 30 to set up in the circuit 32, 34, 33 unidirectional impulses of 20,000 cycles per second having impressed thereon electrical beats having a frequency of 1,000 per second. These impulses will act through the coil 34 inductively on the coil 27 to accentuate or amplify the electrical oscillations of 20,000 cycles per second and the beats of 1,000 per second which have been set up in the closed circuit 28 and will thus increase the effectiveness of the second amplifier 30 and succeeding amplifiers. These impulses in the circuit 32, 34, 33 will also produce electrical oscillations of 1,000 cycles per second in the closed circuit 50 which will set up corresponding oscillations of 1,000 cycles per second in the closed circuit 55. The latter oscillations will be successively amplified by the amplifiers 60 and 70 and will cause unidirectional impulses having a frequency of 1,000 cycles per second to be set up in the circuit 82, 83, 84 controlled by the last acting amplifier 80. These impulses will produce an audible tone in the telephone receiver 84 and will act inductively through the coil 83 upon the coil 57 to accentuate or amplify the electrical oscillations of 1,000 cycles per second in the closed circuit 55, thus increasing the effectiveness of the succeeding amplifiers 60, 70 and 80.

Although only a single form is shown herein in which this invention may be embodied, it is to be understood that the invention is not limited to any specific construction but might be applied in various forms without departing from the spirit of the invention or the scope of the appended claims.

Having thus fully described my invention, I claim:

1. A receiving system for radiant energy, comprising a circuit selectively responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, and a circuit controlled by said second-mentioned amplifier including a source of electrical energy and means arranged to react upon said second-mentioned circuit to increase the effectiveness of said second-mentioned amplifier.

2. A receiving system for radiant energy, comprising a circuit selectively responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, a circuit controlled by said second-mentioned amplifier including a source of electrical energy and means arranged to react upon said second-mentioned circuit to increase the effectiveness of said second-mentioned amplifier, and a beat circuit tuned to respond to the frequency of said beats and arranged to be energized as a result of the operation of said second-mentioned amplifier.

3. A receiving system for radiant energy, comprising a circuit selectively responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, a circuit controlled by said second-mentioned amplifier including a source of electrical energy and means arranged to react upon said second-mentioned circuit to increase the effectiveness of said second-mentioned amplifier, a beat circuit tuned to respond to the frequency of said beats and arranged to be energized as a result of the operation of said second-mentioned amplifier, and an amplifier controlled by said beat circuit.

4. A receiving system for radiant energy, comprising a circuit selectively responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, a circuit controlled by said second-mentioned amplifier including a source of electrical energy and means arranged to react upon said second-mentioned circuit to increase the effectiveness of said second-mentioned amplifier, a beat circuit tuned to respond to the frequency of said beats and arranged to be energized as a result of the operation of said second-mentioned amplifier, an amplifier controlled by said beat circuit, and means controlled by said last-mentioned amplifier for controlling a receiving device.

5. A receiving system for radiant energy, comprising a circuit responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, a circuit controlled by said second-mentioned amplifier including a source of electrical energy and means arranged to react upon said second-mentioned circuit to increase the effectiveness of said second-mentioned amplifier, a beat circuit tuned to respond to the frequency of said beats and arranged to be energized as a result of the operation of said second-mentioned amplifier, an amplifier controlled by said beat circuit, and means controlled by said last-mentioned amplifier for controlling a receiving device, said last-mentioned means being arranged to react upon said beat circuit to increase the effectiveness thereof.

6. A receiving system for radiant energy, comprising a circuit selectively responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, a circuit controlled by said second-mentioned amplifier including a source of electrical energy and means arranged to react upon said second-mentioned circuit to increase the effectiveness of said second-mentioned amplifier, a beat circuit tuned to respond to the frequency of said beats and arranged to be energized as a result of the operation of said second-mentioned amplifier, an amplifier controlled by said beat circuit, and means controlled by said last-mentioned amplifier for controlling a receiving device, said last-mentioned means including an amplifier and a circuit controlled thereby and including a source of energy and said receiving device.

7. A receiving system for radiant energy, comprising a circuit responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, a circuit controlled by said second-mentioned amplifier including a source of electrical energy and means arranged to react upon said second-mentioned circuit to increase the effectiveness of said second-mentioned amplifier, a beat circuit tuned to respond to the frequency of said beats and arranged to be energized as a result of the operation of said second-mentioned amplifier, an amplifier controlled by said beat circuit, and means controlled by said last-mentioned amplifier for controlling a receiving device, said last-mentioned means including an amplifier and a circuit controlled thereby and including a source of energy and said receiving device, said last-mentioned circuit being arranged to react upon said beat circuit to increase the intensity of the beats therein.

8. A receiving system for radiant energy, comprising a circuit selectively responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, a circuit controlled by said second-mentioned amplifier including a source of electrical energy and means arranged to react upon said second-mentioned circuit to increase the effectiveness of said second-mentioned amplifier, a beat circuit tuned to respond to the frequency of said beats and arranged to be energized as a result of said second-mentioned amplifier, an amplifier controlled by said beat circuit, means controlled by said last-mentioned amplifier for controlling a receiving device, said last-mentioned means including a plurality of successively acting circuits tuned to said beat frequency, a plurality of successively acting amplifiers controlled by said successively acting circuits respectively, and a circuit including a source of energy controlled by the last-acting of said successively acting amplifiers and a receiving device controlled by said last-mentioned circuit.

9. A receiving system for radiant energy, comprising a circuit responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, a circuit controlled by said second-mentioned amplifier including a source of electrical energy and means arranged to react upon said second-mentioned circuit to increase the effectiveness of said second-mentioned amplifier, a beat circuit tuned to respond to the frequency of said beats and arranged to be energized as a result of the operation of said second-mentioned amplifier, an amplifier controlled by said beat circuit, means controlled by said last-mentioned amplifier for controlling a receiving device, said last-mentioned means including a plurality of successively acting circuits tuned to said beat frequency, a plurality of successively acting amplifiers controlled by said successively acting circuits respectively, and a circuit including a source of energy controlled by the last-acting of said successively acting amplifiers and a receiving device controlled by said last-mentioned circuit, said last-mentioned circuit being arranged to react upon said beat circuit to increase the effectiveness thereof.

10. A receiving system for radiant energy, comprising a circuit responsive to oscillations of a predetermined frequency, an amplifier controlled by said circuit, a circuit tuned to respond to a frequency different from said first-mentioned frequency and controlled by said amplifier, local means for impressing upon said second-mentioned circuit oscillations having a frequency differing from said second-mentioned frequency so as to produce electrical beats in said second-mentioned circuit, an amplifier controlled by said second-mentioned circuit, a circuit controlled by said second-mentioned amplifier including a source of electrical energy and means arranged to react upon said second-mentioned circuit to increase the effectiveness of said second-mentioned amplifier, a beat circuit tuned to respond to the frequency of said beats and arranged to be energized as a result of the operation of said second-mentioned amplifier, an amplifier controlled by said beat circuit, means controlled by said last-mentioned amplifier for controlling a receiving device, said last-mentioned means including a plurality of successively acting circuits tuned to said beat frequency, a plurality of successively acting amplifiers controlled by said successively acting circuits respectively, and a circuit including a source of energy controlled by the last acting of said successively acting amplifiers and a receiving device controlled by said last-mentioned circuit, said last-mentioned circuit being inductively coupled to said beat circuit to increase the effectiveness of said beat circuit.

11. A receiving system for radiant energy, comprising a circuit tuned to a given frequency, an amplifier controlled by said circuit, a second circuit tuned to a second freqency and arranged to be controlled by said amplifier, a second amplifier controlled by said second circuit, a third circuit tuned to a third frequency and arranged to be controlled by said second amplifier, amplifying means controlled by said third circuit, said amplifying means including an amplifier controlled by said third circuit, a plurality of successively acting circuits tuned to said third frequency and controlled by said last-mentioned amplifier, a plurality of successively acting amplifiers controlled by said successively acting circuits respectively, and a circuit controlled by the last acting of said successively acting amplifiers and inductively coupled to said third circuit to increase the effectiveness thereof.

12. A receiving system for radiant energy, comprising an electrical circuit, means for producing electrical beats in said circuit, a detector and a circuit arranged to be controlled by the detector, said second-mentioned circuit including a source of energy and being arranged to react upon said first-mentioned circuit to accentuate the beats therein.

13. A receiving system for radiant energy comprising a circuit, local means coupled to said circuit for producing electrical beats in said circuit with the received waves, an amplifying detector and a circuit arranged to be controlled by the detector as a result of the action of said first-mentioned circuit, said second-mentioned circuit including a source of energy and being arranged to react upon said first-mentioned circuit to intensify the beats therein.

14. A receiving system for radiant energy comprising a circuit selectively responsive to oscillations of a predetermined frequency having variations of a secondary frequency impressed thereon, a detector controlled by said circuit, a circuit tuned to respond to said secondary frequency and controlled by said detector, local means for impressing upon said second mentioned circuit oscillations having a frequency differing from said secondary frequency so as to produce beats in said second mentioned circuit, an amplifying and detecting device controlled by said second mentioned circuit, a circuit controlled by said device and arranged to react upon said second mentioned circuit to increase the effectiveness of said device as an amplifier, and a receiving device controlled by said detecting and amplifying device.

15. A receiving system for radiant energy comprising a circuit selectively responsive to oscillations of a predetermined frequency having variations of a secondary frequency impressed thereon, an amplifying detector controlled by said circuit, a circuit tuned to respond to said secondary frequency and controlled by said detector, local means for impressing upon said second mentioned circuit oscillations having a frequency differing from said secondary frequency so as to produce electrical beats in said second mentioned circuit, an amplifier controlled by said second mentioned circuit, means controlled by said second-mentioned amplifier for reacting upon said second mentioned circuit to increase the effectiveness of such amplifier, and means controlled by second mentioned amplifier and including a beat circuit for controlling a receiving device.

16. A receiving system for radiant energy comprising a circuit selectively responsive to oscillations of a predetermined frequency having a secondary frequency impressed thereon, an amplifier controlled by said circuit, a circuit tuned to respond to said secondary frequency and controlled by said amplifier, local means for impressing upon said second mentioned circuit oscillations having a frequency differing from said secondary frequency so as to produce electrical beats in said second mentioned circuit, an amplifier controlled by said second mentioned circuit, means arranged to react upon said second mentioned circuit to increase the effectiveness of said second mentioned amplifier, means controlled by said second mentioned amplifier and including a beat circuit for controlling a receiving device, and means arranged to react upon said beat circuit to increase the effectiveness thereof.

Signed at Gloucester, in the county of Essex and State of Massachusetts, this sixth day of June, A. D. 1918.

JOHN HAYS HAMMOND, Jr.